United States Patent [19]
Usui et al.

[11] Patent Number: 5,847,478
[45] Date of Patent: Dec. 8, 1998

[54] ELECTRO-MAGNETIC CLUTCH

[75] Inventors: Hiroshi Usui; Shingo Nakagawa, both of Gifu-ken, Japan

[73] Assignee: Teijin Seiki Co., Ltd., Osaka, Japan

[21] Appl. No.: 805,622

[22] Filed: Feb. 26, 1997

[30] Foreign Application Priority Data

Feb. 27, 1996 [JP] Japan .................................. 8-065485

[51] Int. Cl.$^6$ .......................... F16D 67/06; H02K 49/10
[52] U.S. Cl. ......................... 310/76; 310/75 D; 310/103; 310/105; 310/106; 188/161; 188/163; 192/84.3; 192/84.31
[58] Field of Search ..................................... 310/106, 103, 310/75 D, 105, 76, 77, 78; 188/161, 163, 164; 192/84.3, 84.31, 71.5

[56] References Cited

U.S. PATENT DOCUMENTS

| | | | |
|---|---|---|---|
| 3,730,317 | 5/1973 | Jaeschke | 192/84 R |
| 4,496,922 | 1/1985 | Pardee | 335/281 |
| 4,978,874 | 12/1990 | Isozumi et al. | 310/83 |
| 5,050,711 | 9/1991 | Sawato | 188/164 |
| 5,119,918 | 6/1992 | Pardee | 192/18 B |
| 5,121,018 | 6/1992 | Oldakowski | 310/77 |
| 5,172,798 | 12/1992 | Mabee | 192/18 B |
| 5,185,542 | 2/1993 | Lazorchak | 310/36 |
| 5,490,583 | 2/1996 | Anderson et al. | 188/161 |

*Primary Examiner*—Thomas M. Dougherty
*Assistant Examiner*—Tran N. Nguyen
*Attorney, Agent, or Firm*—Rothwell, Figg, Ernst & Kurz

[57] ABSTRACT

A self holding type connecting device comprising an armature which is disposed movably in an axial direction, a magnetic path member having a cross section formed along a closed loop and having an axial space wherein axial movement of the armature is permitted, a permanent magnet secured to the magnetic path member and forming two kinds of magnetic flux which pass through the armature and the magnetic path member, an electric magnetic coil which forms magnetic flux for moving the armature in an axial direction against the two kinds of magnetic flux, and switch for switching direction of the magnetic flux from the electric magnetic coil. In the device, decrease of connecting force due to abrasion of pads does not occur and power consumption can be remarkably reduced.

5 Claims, 4 Drawing Sheets

ELECTRO-MAGNETIC CLUTCH

BACKGROUND OF THE INVENTION

1. Filed of the Invention

The present invention relates to a self holding type connecting device, more specifically, a self holding type braking device which is connected to a rotating body and which brakes rotation of the rotating body, or a self holding type clutch device which is connected to a rotating body and which transmits rotation of the rotating body to another rotating body.

2. Description of Related Art

The present invention will now be explained by exemplifying a conventional electromagnetic braking device. In a conventional electromagnetic braking device wherein a solenoid is used, when the solenoid is not energized, an armature is pressed to a rotor by means of mechanical force exerted by a spring, and the braking operation is done by the frictional force, When the solenoid is energized, electro-magnetic force is exerted so that the armature is separated from the rotor, and thus, the rotor is released from restriction of the braking device.

However, if the spring is broken while the braking device is working, the braking operation will be released. Contrary to this, if generation of the electromagnetic force is cut down due to breakage of the solenoid coil or power source trouble, the braking device continues the braking condition.

Further, continued power supply is necessary while the braking device is being disconnected. The spring force, and accordingly, the attracting force of the solenoid, has to be increased in order to increase the braking force, electric current supplied with the solenoid has to be correspondingly increased, and power consumption is inevitably increased.

In the conventional electromagnetic braking device, a brake pad is placed in contact with the rotating body by means of mechanical force generated by the spring so as to generate braking force. If the brake pad is abraded, the extension of the spring increases, and accordingly, the pressing force of the spring decreases. As a result, the braking force is reduced.

The above-explanation has been done with reference to an electro-magnetic braking device, similar problems may occur in an electro-magnetic clutch device by which connection and disconnection between rotating bodies are performed.

OBJECTS OF THE INVENTION

It is an object of the present invention to overcome the above-described problems inherent to a conventional electro-magnetic braking device or a conventional electro-magnetic clutch device.

It is another object of the present invention to provide a self holding type connecting device according to which magnetic force of a permanent magnet is used to hold the operating/no-operating conditions, and electric supply is required only when the condition between the operating/no-operating conditions is switched, and by which disposition of the spring is omitted, the operating and non-operating conditions are not switched due to trouble and/or damage of the constituent parts, decrease of connecting force does not occur due to abrasion of the pad, and power consumption can be remarkably reduced.

SUMMARY OF THE INVENTION

According to the present invention, the above-described objects are achieved by a self holding type connecting device comprising an armature which is disposed movably in an axial direction, a magnetic path member having a cross section formed along a closed loop and having an axial space wherein axial movement of the armature is permitted, a permanent magnet secured to the magnetic path member and forming two kinds of magnetic flux which pass through the armature and the magnetic path member, an electric magnetic coil which forms magnetic flux for moving the armature in an axial direction against the two kinds of magnetic flux, and means for switching direction of the magnetic flux from the electric magnetic coil.

According to the present invention, the armature may be so constructed that it is movable in an axial direction and is unable to rotate, whereby the armature constitutes an electro-magnetic brake for braking a rotating body. Further, the armature may be so constructed that it is movable in an axial direction and is rotatable, whereby the armature constitutes an electromagnetic clutch for transmitting rotation between the rotating bodies. In addition, the rotating body may be secured to a spindle of a motor whereby a brake motor or a motor provided with a clutch is constituted.

According to the present invention, since a self holding type connecting device is provided, the braking or clutching conditions (operating/non-operating) do not change incidentally due to trouble of the parts constituting the brake or clutch, and safety of the system is highly increased.

According to the present invention, since the solenoid is energized only when the operating condition is switched, electric power consumption can be remarkably reduced.

Further, according to the present invention, there is a tendency that the amount of the air gap decrease when a brake pad is abraded, as a result, the attracting force, and accordingly, the braking force, is increased. Thus, the performance is not adversely influenced even when the abrasion occurs. If a stop is disposed at a predetermined position within the air gap, the pressing force (braking force) during the braking condition and the holding force during the non-operating condition can be set at will.

BRIEF DESCRIPTION OF THE DRAWINGS

The present invention will now be explained in detail with reference to the accompanying drawings, wherein.

DESCRIPTION OF THE PREFERRED EMBODIMENTS

Referring to FIGS. 1 to 6, we will now explain the operating principle of the present invention which is carried out in a self holding type electro magnetic braking device hereinbelow.

Figure 1:
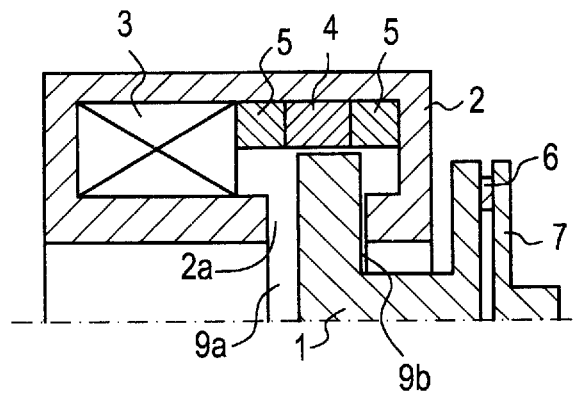
FIG. 1 is a cross sectional view for illustrating the operating principle of the present invention.

The self holding type electro magnetic braking device according to the present invention comprises an armature 1 which is disposed movably in an axial direction (horizontally on the sheet wherein FIG. 1 is illustrated) and is unable to rotate about the axis, a magnetic path member 2 for passing magnetic flux therethrough having a cross section formed in a C-shape as illustrated in a cross sectional view in FIG. 1 and having a small space wherein axial movement of the armature 1 is permitted, an electromagnetic coil 3 accommodated in the space of the magnetic path member 2, a permanent magnet 4 secured to the outside of the armature 1, and non-magnetic members 5 and 5 disposed at both the sides of the permanent magnet 4. The armature 1 has a brake pad 6 secured to the right side thereof, and when the armature 1 moves within the open space 2a of the magnetic path member 2 as illustrated in FIG. 1 so as to be pressed against a rotor 7 which is connected to an output spindle of a motor (not illustrated in FIG. 1), the braking operation is performed.

The magnetic resistances of the air gaps 9a and 9b, which are formed in the open space 2a between the ends of the magnetic path member 2 and the armature 1, respectively, are proportional to the lengths of the air gaps 9a and 9b, respectively. The attracting forces exerted on the armature 1 through the air gaps 9a and 9b are proportional to the reciprocals of the magnetic resistances of air gaps 9a and 9b, respectively.

The lengths of the air gaps 9a and 9b in the following explanation are only for example, and they may be outside the exemplified range depending on the amount of stroke of the brake, the size of the brake and so on.

Figure 2:
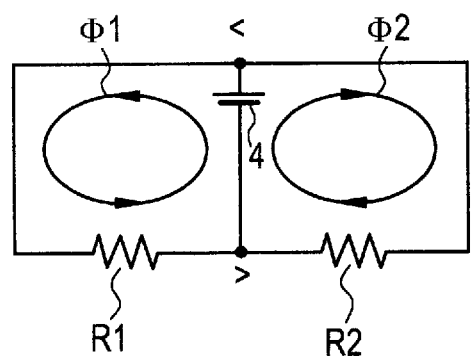
FIG. 2 is an equivalent magnetic circuit of the condition illustrated in FIG. 1.

(1) Upon Holding the Brake Condition in an Operating Condition:

In order to hold the brake condition in an operating condition, as will be described later, the electric coil 3 is supplied with current and the armature 1 is moved toward the rotor 7 so as to be in a condition illustrated in FIG. 1. The equivalent magnetic circuit under this condition is illustrated in FIG. 2.

More specifically, since the armature 1 moves toward the rotor 7, the air gaps 9a and 9b vary, for example, the left air gap 9a becomes 4 to 6 mm and is larger than the right air gap 9b, which is 0 to 2 mm. Thus, the resistance of the magnetic path R1 becomes larger than that R2. Accordingly, the magnetic flux Φ1 becomes smaller than that Φ2, and the attracting force F2 which is exerted in the air gap 9b becomes larger than that F1 which is exerted in the air gap 9a. As a result, once the armature 1 is moved axially, to the right in FIG. 1, the armature 1 is kept to be pressed against the rotor 7 due to the difference in the attracting forces, i.e., the holding force, which is equal to the amount F2 minus F1.

Figure 3:
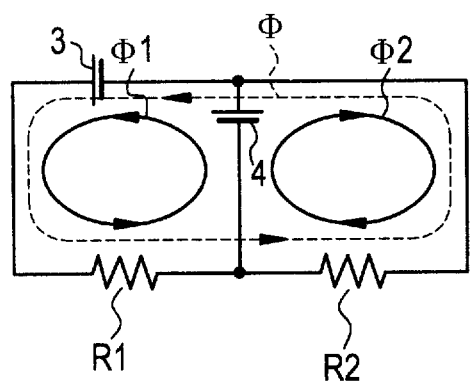
FIG. 3 is an equivalent magnetic circuit for explaining the transfer from the operating condition to the non-operating condition.

(2) Upon Transferring the Brake Condition from the Operating Condition to a Non-operating Condition:

As described above, upon holding the brake condition in the operating condition, the magnetic flux Φ1 is smaller than that Φ2, and the attracting force F2 is larger than that F1. In order to transfer the brake condition from this condition to a non-operating condition, it is necessary to move the armature 1 against the holding force, which is equal to an amount F2 minus F1, in a direction wherein it is the separated from the rotor 7. According to the present invention, this movement of the armature 1 is performed by the electro-magnetic coil 3. The equivalent magnetic circuit upon transfer of the brake condition from the operating condition to the non-operating condition is illustrated in FIG. 3. It is necessary to generate the magnetic flux Φ by the electromagnetic coil 3, which flux directs as illustrated in FIG. 3.

More specifically, if the electromagnetic coil 3 generates the magnetic flux Φ, the combined magnetic flux (Φ2 minus Φ) being smaller than that (Φ1 plus Φ), the armature 1 moves in a direction opposite to that described above, i.e., in a direction wherein the armature separates from the rotor 7. Accordingly, the brake becomes in a non-operating condition.

Figure 4:
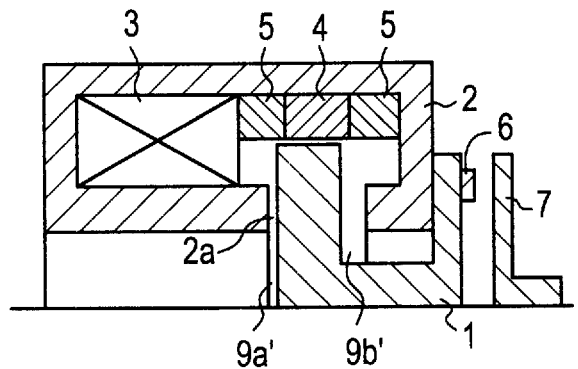
FIG. 4 is a cross sectional view for illustrating the principle of the present invention under the non-operating condition.
Figure 5:
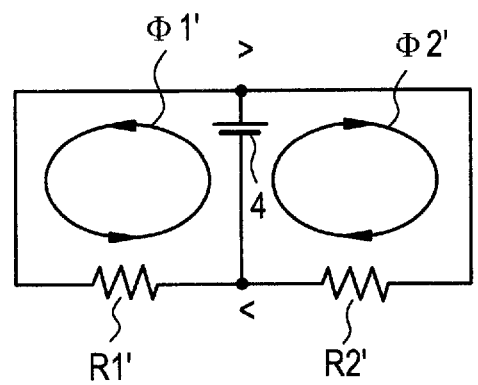
FIG. 5 is an equivalent magnetic circuit of the condition illustrated in FIG. 4.

(3) Upon Holding the Brake Condition in the Non-Operating Condition:

The cross sectional view and the equivalent magnetic circuit under the condition wherein the brake is in a non-operating condition are illustrated in FIGS. 4 and 5, respectively. More specifically, the left air gap 9a' becomes to a an amount, for example, between 0 and 2 mm and is smaller than the right air gap 9b' which is for example 4 to 6 mm, and the magnetic resistance R2' becomes larger than R1', the magnetic flux Φ2' becomes smaller than Φ1. Thus, the relationship between the attracting forces in the air gasps 9a' and 9b' is such that the attracting force F1' which is exerted in the air gap 9a' is larger than that F2' which is exerted in the air gap 9b'. The armature 1 is kept in a condition wherein it is separated from the rotor 7 due to the difference in the attracting forces, i.e., the holding force, which is equal to the amount F1' minus F2'.

Figure 6:
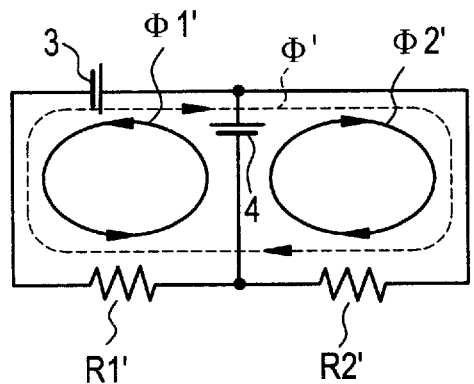
FIG. 6 is an equivalent magnetic circuit for explaining the transfer from the non-operating condition to the operating condition.

(4) Upon Transferring the Brake Condition from the Non-Operating Condition to an Operating Condition:

The equivalent magnetic circuit under the condition wherein the brake condition is transferred from the non-operating condition to an operating condition is illustrated in FIG. 6. As described above, upon holding the brake in a non-operating condition, since the magnetic flux Φ1' was larger than that Φ2', the attracting force F1' was larger than that F2'. In order to transfer the brake from this condition to an operating condition, it is necessary to generate the magnetic flux Φ' by the electromagnetic coil 3, which flux directs as illustrated in FIG. 6.

More specifically, if the electromagnetic coil 3 generates the magnetic flux Φ', the combined magnetic flux (Φ1' minus Φ') being smaller than that (Φ2' plus Φ'), in a direction opposite to that described above, the armature 1 moves in an opposite direction toward the rotor 7. Accordingly, the brake becomes in an operating condition.

According to the present invention, a switch is used to control the generation of magnetic flux by the electromagnetic coil 3 and control the generating direction of the magnetic flux Φ and Φ' by changing the polarities of the electric voltages supplied with the two wires connected to the electro-magnetic coil 3 so as to change the generating directions of the magnetic flux Φ and Φ' by the electromagnetic coil 3. Accordingly, the present invention includes a switch for switching the generation and direction of the the magnetic flux by the electromagnetic coil 3.

Figure 7:
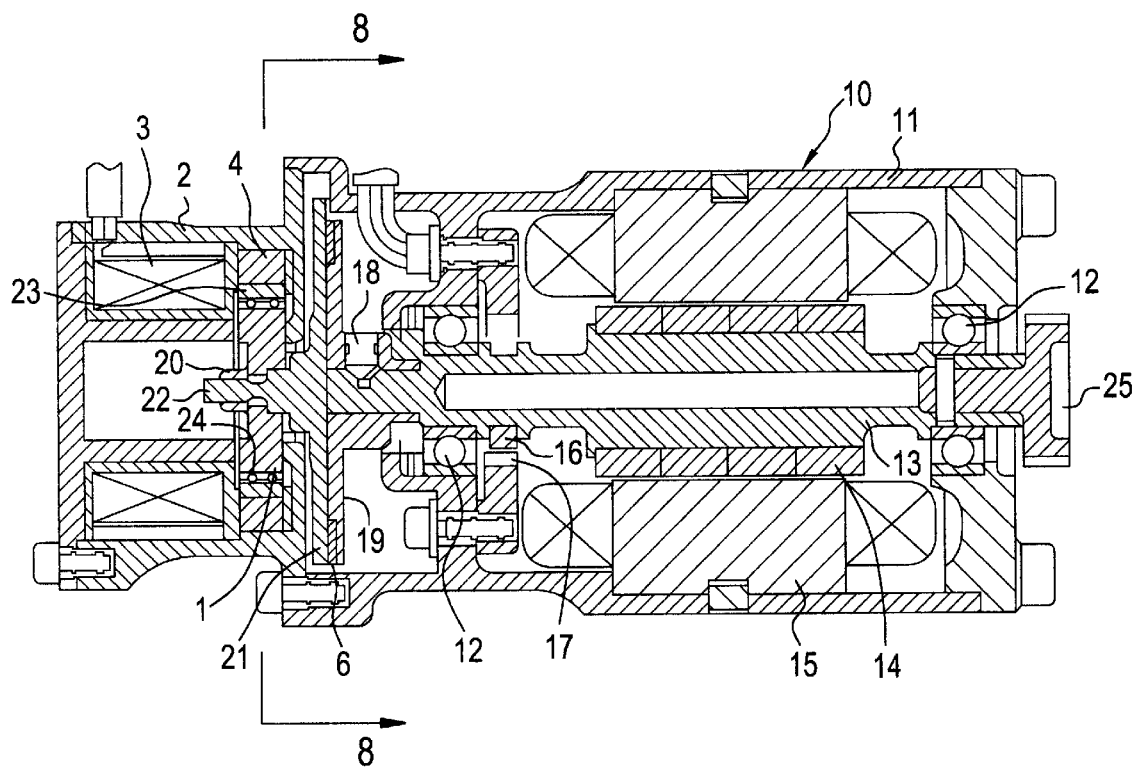
FIG. 7 is a cross sectional view of a brake motor wherein the present invention is carried out.

An embodiment wherein the present invention is carried out in a brake motor will now be explained in the concrete. FIG. 7 shows a brake motor wherein the present invention is carried out. The right half portion in FIG. 7 constitutes a brushless motor, and an electromagnetic brake according to the present invention is disposed at the left half in FIG. 7. Although a motor according to the present invention is not limited to that illustrated herein and may be of any conventionally known type. The illustrated embodiment will now be briefly explained.

A shaft 13 is rotatably supported in a case 11 by means of a pair of bearings 12 and 12. The shaft 13 has an output member, for example, a gear wheel 25, at the right end thereof, so as to take out output of the motor through the gear wheel 25. The shaft 13 has permanent magnets 14 secured at the center thereof which magnets serve as a rotor. An electric magnet 15, which is provided with coil and which will serve as a stator, is disposed in such a manner that it faces to the rotor 14 forming a small clearance therebetween. The shaft 13 has a small permanent magnet 16 at the left end thereof, which magnet is used to detect the rotation of the shaft 13. A hole IC 17 is disposed in such a manner that it faces the permanent magnet 16. The phase of the magnetic poles of the rotor 14 is detected by the permanent magnet 16 and the hole IC 17 so as to control current supply to the coil of the rotor 14.

The shaft 13 has a disc brake rotor 19 formed in a circular and secured to the left end thereof by means of a lock screw 18. A brake rotor 21 which is similarly formed in a circular disc is disposed so that it faces to the circular brake rotor 19 of the shaft 13. Both of or either one of the brake rotors 19 and 21 have brake pads 6 attached thereto. A shaft 22 projecting from the brake rotor 21 has a circular disc 1 having a small diameter and secured thereto by means of a nut 20. The circular disc 1 serves as the armature of the present invention. As will be described later, the brake rotor 21, the shaft 22 and the armature 1 are able to move in an axial direction as a whole but are unable to rotate about the axis. A permanent magnet 4 is disposed in such a manner that it faces the armature 1.

A magnetic path member 2 having a C-cross section is disposed in such a manner that its ends sandwiches the small circular disc portion of the armature 1. The magnetic path member 2 has a permanent magnet 4 secured thereto and is so constructed that two sets of magnetic flux generated from the permanent magnet 4 pass through the armature 1, respectively.

Figure 8:
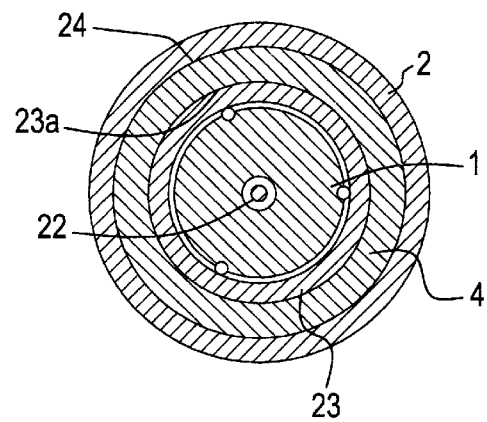
FIG. 8 is a cross sectional view taken along line 8—8 in FIG. 7.

Small air gaps 9a and 9b are formed between the small circular disc portion of the armature 1 and the ends of the magnetic path member 2, respectively. The armature 1 is moved axially along the permanent magnet 4 in this embodiment. However, if the radial thickness of the permanent magnet 4 is large, machining is very difficult. Further, if the sliding surface is directly formed on the permanent magnet 4 itself, there may occur a problem of inferior strength of the permanent magnet. Accordingly, in this embodiment, a metal member 23 which has a good machining ability and excellent strength is integrally disposed within the inner portion of the permanent magnet 4. The metal member 23 has three recesses 23a for supporting roller guides 24 at the periphery thereof as illustrated in FIG. 8. The roller guides 24 guide the mutual movement in an axial direction between the metal guide member 23 and the armature 1.

In this embodiment, projections and depression, which are engage with each other so as to prohibit their mutual rotation, are formed at the periphery of the brake rotor which has a large diameter of the armature and the inner surface of the case 11, respectively, so that the armature 1 itself can move in an axial direction for a small distance so as to serve as an electromagnetic braking device which brakes the rotation of the motor and so that it does not rotate about the axis.

In the electro-magnetic braking device of the present invention which has such a construction as described above, when the rotation of the motor is stopped or performed, as described above, the magnetic flux is controlled by the permanent magnet and the coil disposed at the left of the permanent magnet.

Although the above-described explanation has been done with reference to a motor provided with an electro-magnetic brake, the present invention may be applied for a clutch device if the armature is movable in an axial direction and is rotatable about an axis. An example of such a clutch example is illustrated in FIG. 9.

Figure 9:
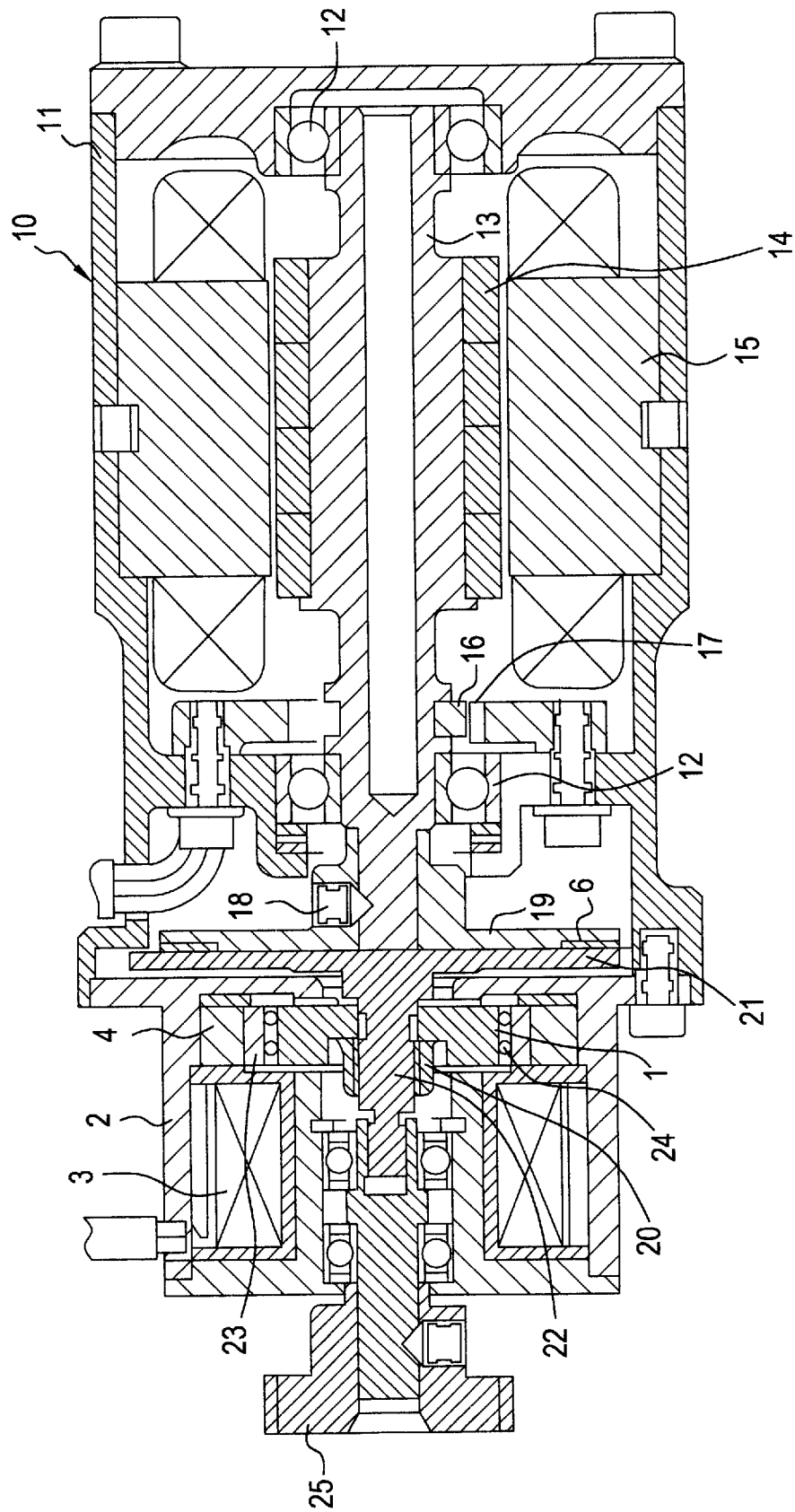
FIG. 9 is a cross sectional view of a motor provided with a clutch wherein the present invention is carried out.

According to the motor provided with a clutch and illustrated in FIG. 9, the output of the motor is taken out and shut off. Accordingly, the brake rotors 19 and 21 and brake pads 6 which were described with reference to the previous embodiment are replaced with clutch rotors 19 and 21 and clutch pads 6 in this embodiment. Further, this embodiment differs from the above-described embodiment in that not only the clutch rotor 21, the shaft 22 and the armature 1 are as a whole movable in an axial direction, but also they are rotatable about the axis. However, the constructions of the constituting parts are substantially the same. In addition, the output member such as the gear wheel 25 was disposed at the shaft 13 in the above-described embodiment, an output member such as a gear wheel 25 is coupled to the shaft 22 of the clutch by means of spline 24, and the clutch rotor 21, the shaft 22 and the armature 1 are moveable in an axial direction regardless of the gear wheel 25. Since the remaining constructions are similar to those of the above-described embodiment, further explanation therefor will be omitted.

The present invention achieves the following advantages.

(1) According to the present invention, the conditions of the brake or the clutch (operating condition/non-operating condition) are not changed against will due to trouble of the parts constituting the brake, and accordingly, safety of the system increases.

(2) According to the present invention, since the time for supplying electric current to the coil of the solenoid can be very short, power consumption can be remarkably reduced.

(3) According to the present invention, when the brake pads are abraded, there is a tendency that the air gap is shortened, and as a result, the attracting force increases and the braking force increases. Thus, the performance is not adversely influenced even if abrasion occurs.

(4) According to the present invention, if a stop is disposed at a predetermined position within the air gap, pressing force upon brake operation, i.e., barking force and holding force during non-operating condition can be set at will.

(5) Although the present invention has been explained by exemplifying application to an electromagnetic brake or clutch in this specification, it is also applicable to a product, such as a solenoid valve, utilizing solenoid therein, and advantages similar to those described herein can be expected.

What is claimed is:

1. A self-holding type connecting device comprising an armature which is disposed movably in an axial direction, a magnetic path member having a cross section formed along a closed loop and having an axial space wherein axial movement is permitted, a permanent magnet secured to said magnetic path member, a leg of said armature extending into said axial space to form part of a magnetic flux path, said permanent magnet providing magnetic flux to first and second paths, said first path including said magnetic path member on one side of said axial space and said second magnetic flux path including said magnetic path member on an opposite said of said axial space, and an electro-magnetic coil positioned and energizable to provide magnetic flux overcoming the magnetic flux of said permanent magnet for moving said armature leg in an axial direction in said axial space from one said magnetic flux path to the other the axial direction of movement being in accordance with polarization of said electromagnetic coil, said armature being held in place by magnetic flux of said permanent magnet when said electro magnetic coil is not energized.

2. A self holding type connecting device according to claim 1 interacting with a rotating body, wherein said armature is movable in an axial direction and is unable to rotate, whereby said armature constitutes an electro-magnetic brake for braking said rotating body.

3. A self holding type connecting device according to claim 1, wherein said rotating body is secured to a spindle of a motor whereby a brake motor is constituted.

4. A self holding type connecting device according to claim 1, wherein said armature is movable in an axial direction and is rotatable, whereby said armature constitutes an electro-magnetic clutch for transmitting rotation of a rotating body.

5. A self holding type connecting device according to claim 4, wherein said rotating body is secured to a spindle of a motor whereby a motor provided with a clutch is constituted.

* * * * *